United States Patent [19]

Pfahl, Jr. et al.

[11] Patent Number: 5,220,936
[45] Date of Patent: Jun. 22, 1993

[54] VAPOR CONTAINMENT APPARATUS

[75] Inventors: Robert C. Pfahl, Jr., Glen Ellyn; Lawrence R. Hagner, Naperville; James A. Wrezel, Buffalo Grove, all of Ill.

[73] Assignee: Motorola, Inc., Schaumburg, Ill.

[21] Appl. No.: 829,205

[22] Filed: Feb. 3, 1992

[51] Int. Cl.⁵ .............................................. B08B 13/00
[52] U.S. Cl. .................................. 134/108; 134/105; 34/73; 202/170
[58] Field of Search ................... 134/105, 107, 108; 68/18 C, 5 E; 202/170; 34/73, 78; 118/61, 64, 65, 69

[56] References Cited

U.S. PATENT DOCUMENTS

| | | | |
|---|---|---|---|
| 1,907,875 | 5/1933 | Robertson | 202/170 X |
| 1,911,926 | 5/1933 | Robertson | 202/170 X |
| 3,656,492 | 4/1972 | Holm et al. | 134/108 X |
| 3,904,102 | 9/1975 | Chu et al. | |
| 3,947,240 | 3/1976 | Pfahl, Jr. | |
| 4,389,797 | 6/1983 | Spigarelli et al. | 34/73 |
| 4,640,719 | 2/1987 | Hayes et al. | |

Primary Examiner—Philip R. Coe
Attorney, Agent, or Firm—Kenneth W. Bolvin

[57] ABSTRACT

The apparatus of the present invention uses a vessel with a sump for containing a liquid (103). The vessel has one or more downward angled openings (101). A heating device (104) boils the liquid to produce a vapor and a condensing apparatus (102), in the opening or in a separate chamber, prevents any vapor from exiting the apparatus. The apparatus contains a condensable liquid having a vapor density less than that of the ambient atmosphere by producing a stably stratified interface between the condensable vapor and the ambient atmosphere. The apparatus can be used for such manufacturing processes as cleaning or coating with vapors that are less dense than air.

3 Claims, 1 Drawing Sheet

VAPOR CONTAINMENT APPARATUS

FIELD OF THE INVENTION

The present invention relates generally to the field of apparatuses for containing liquid fluid and their condensable vapors for the purpose of affecting processing with the liquid fluid and its vapor.

BACKGROUND OF THE INVENTION

Numerous apparatuses have been described in the literature whose purpose is to contain a boiling liquid fluid and the condensable vapor of the fluid in a vessel open to the atmosphere at the top. Open signifies that no doors or locks are used to contain the vapor. The vessel, also known as a sump, has a source of heat that boils the liquid. At the top of the vessel there is some form of condensing apparatus to condense the vapor. This condensing apparatus is typically in the form of cooling coils or a cooling jacket. Typically, chilled water is used as the cooling medium.

Another form of this type of apparatus has a weir, a projection of a specific length, at the top of the vessel that allows the dense vapors of the fluid to "spill" over the weir into a condensing apparatus. The condensed vapor is normally returned as liquid to the sump for reboiling.

The above described apparatuses presume that the fluid has a vapor density greater than that of the surrounding atmosphere. Consequently, a stable horizontal interface is formed between the condensable fluid vapor beneath the atmosphere (typically ambient air). The vapor-interface is a narrow, stable region if the density of the vapor is significantly greater than the ambient air because the system is stably stratified.

When such an apparatus is used for assembly cleaning, is is known as a vapor degreaser and the condensable fluid is typically a fluorinated or chlorinated solvent or an azeotrope of such a solvent. Examples of such a fluid are dichlorodifluromethane, 1,1,1,-trichloroethane, or an azeotrope of dichlorodifluoromethane and methanol. The vapors of these solvents are much denser than ambient air. In these systems, a boiling sump typically contains the solvent along with contaminants removed in a cleaning process; the vapor and the condensate are highly purified.

The assembly to be cleaned is typically lowered into the vapor space by passing it through the interface between the solvent vapor and ambient air. The assembly is then either immersed in liquid solvent or sprayed with liquid solvent to remove most of the contaminant. It is then withdrawn to the vapor where a small amount of clean vapor is condensed on the assembly to provide a final rinse. The assembly is then withdrawn through the stable interface between the solvent vapor and ambient air. Since the assembly has been heated by the condensing vapor to a temperature approaching the atmospheric boiling temperature of the solvent, the remaining liquid solvent on the assembly normally vaporizes rapidly into the ambient atmosphere following withdrawal from the solvent vapor.

When such an apparatus is used for melting or reflowing solder, it is known as a condensation or vapor phase soldering machine. In vapor phase soldering, the condensable fluid is typically a perfluorinated fluid with a boiling point in excess of the melting point of the solder. The vapors of these fluids are much denser than ambient air. In these systems the assembly to be soldered typically is lowered into the vapor space by passing it through the interface between the fluid vapor and ambient air. The assembly is rapidly heated by the latent heat of vapor condensing on its surface until the assembly's temperature approaches the atmospheric boiling temperature of the fluid which exceeds the melting point of the solder on the assembly. The assembly is then withdrawn into the air.

The concept of stable stratification can be used to introduce a secondary condensable vapor into the system as in the case of a secondary vapor blanket for condensation soldering. In this case, the primary vapor is of greater density than a secondary vapor which is of greater density than the ambient air. The secondary vapor, therefore, retains the primary vapor in the vessel.

During the 1980s it was discovered that many chemically stable chlorinated and fluorinated fluids had the potential of destroying the ozone in the stratosphere. Models have shown that these chemically stable halogenated fluids can migrate to the stratosphere where they act as catalysts for rapidly depleting ozone. These fluids are frequently referred to as ozone depleting chemicals. The Montreal Protocol, the United States Clean Air Act of 1990 and other legislation and regulations throughout the world have established a strict time schedule to eliminate the use of such fluids. In addition, environmental concerns over the impact of volatile organic compounds and their effect of producing smog and creating ozone in the lower atmosphere have resulted in legislation and regulations controlling the emissions of such organic fluids as alcohols in addition to the halogenated fluids. Consequently, there has been significant research and development to find alternative fluids to use in a variety of manufacturing processes including cleaning, coating, and soldering.

One common fluid of interest for cleaning and coating applications is water. Water is a good solvent for ionic contaminants and, when used in conjunction with surfactants, detergents, terpenes, etc., can be used to remove organic contaminants. It would be desirable to use a vapor containment apparatus as described above with liquid water and steam; such a system would contain a sump with boiling water that might contain contaminants or other processing chemicals such as surfactants or detergents and it would generate a vapor space with purified water vapor.

It is difficult, however, to contain the steam vapor in a chamber open to the atmosphere; water boiling in a pot "plumes" into the room because its density is less than ambient air. There is a resulting need for an apparatus that contains vapor having a density less than air and is open to the ambient air, thus allowing easy entrance and exit of assemblies for processing within the apparatus.

SUMMARY OF THE INVENTION

The apparatus of the present invention contains the vapor of a condensable liquid. The vapor has a density less than that of the ambient atmosphere. The apparatus contains one or more downward facing openings. The apparatus is also comprised of means for containing the condensable liquid, means for heating the liquid to form the vapor, and means for condensing the vapor, the means for condensing at or near each downward facing opening.

DETAILED DESCRIPTION OF THE PREFERRED EMBODIMENT

The present invention creates an air-vapor interface in which a condensable vapor produced by boiling a liquid fluid is stably stratified above the ambient atmosphere in order to contain the condensable vapor without the use of doors or locks. The preferred condensable vapor is water vapor (steam) that is less dense than air by the ratio of their molecular weights, 18/28.

Figure 1:
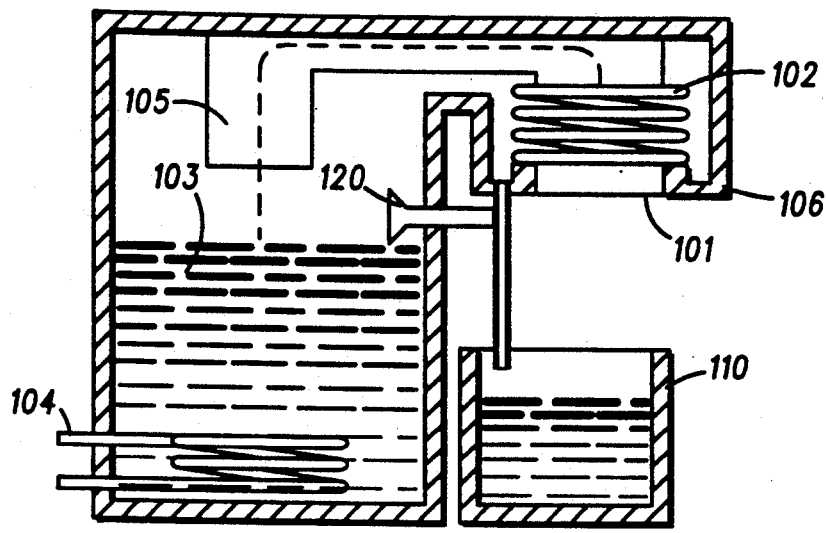
FIG. 1 shows the preferred embodiment with a single opening in accordance with the present invention.

The preferred embodiment of the vapor containment apparatus of the present invention is illustrated in FIG. 1. The apparatus is comprised of a vessel with a single downward facing opening (101) surrounded by a condensing apparatus (102). The bottom of the vessel is a sump containing the liquid (103) and a means of heating (104) the liquid (103) to the boiling temperature.

A conveyor (105) raises an assembly to be processed through the air-steam interface into the vessel. In a preferred embodiment, the boiling liquid (103) is water containing a detergent. The assembly can be a metal component or an electronic assembly that requires precision cleaning and degreasing.

The assembly is raised through the interface into the distilled steam, traversed over the boiling sump, and then lowered into the boiling sump where it is degreased by action of the detergent in the boiling water. The assembly is then raised into the vapor space condensing apparatus to perform a primary rinse or drying operation.

One embodiment of the present invention uses clean water sprayed with a spraying device (120) on the assembly to perform the rinse operation. The water that runs off the assembly is collected in the sump's boiling liquid.

The rinsed assembly is left in the vapor long enough to heat it to the temperature of the surrounding vapor. The assembly is then withdrawn from the apparatus by being lowered across the stable steam/air interface where the little remaining moisture rapidly evaporates because of the high temperature of the assembly.

In the preferred embodiment, the apparatus contains various vent lines to assure that, during establishment and maintenance of the vapor, all non-condensable gases, such as air, are eliminated from the vapor space.

The condensing apparatus (102) is a cool condensing surface at a temperature lower than the boiling temperature of the fluid (103) which, in the case of water, is preferably at a temperature below ambient and above the freezing temperature of water. A trough (106) or similar channeling device encircles the opening (101) to capture the condensing vapor. This vapor is distilled and therefore can be used to advantage either to be sprayed on the assembly or transported to a clean sump (110).

Figure 2:
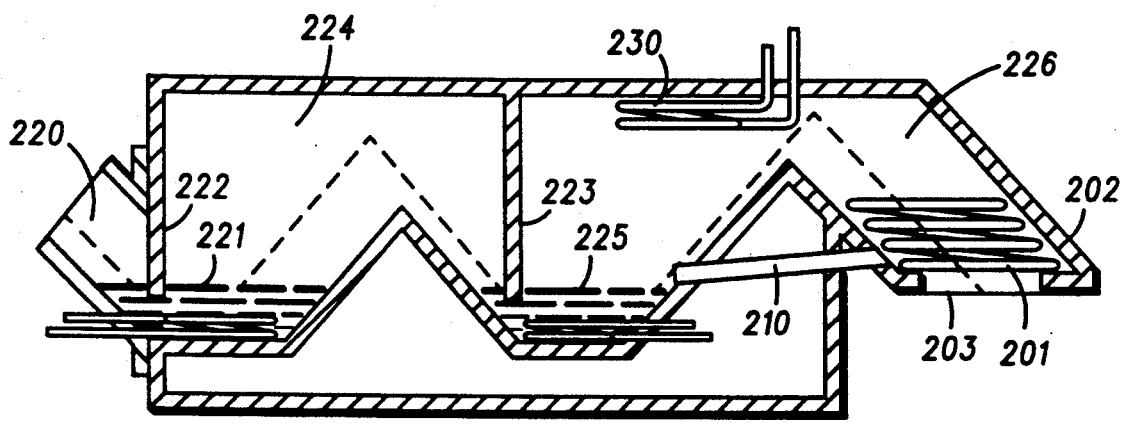
FIG. 2 shows an alternate embodiment of the present invention having an entrance sealed from the vapor section.

FIG. 2 illustrates a second embodiment of the apparatus of the present invention designed for cleaning or defluxing printed circuit boards with a semi-aqueous solvent, such as a terpene, followed by rinsing in water.

The apparatus is comprised of a first sump of washing liquid (221), a terpene in the preferred embodiment, and a second sump of rinsing fluid (225), water in the preferred embodiment, that is boiled and thus converted to vapor.

The apparatus is divided internally to seal the common vapor space above portions of the two sumps of liquid to contain all vapors of both the washing and rinsing fluids. These separators (222 and 223) extend from the top of the apparatus into the two liquid sumps. The separators, therefore, prevent the vapor between the two liquid seals from escaping through the entrance or exit when the liquid levels are maintained properly.

The exit (202) of the embodiment illustrated in FIG. 2, which extends downward, is lined with condensing coils (201). The downward direction and the condensing coils (201) prevent the vapors, preferably steam, from exiting the apparatus. Since the vapor is less dense than the surrounding air, the vapor will remain above the air at the exit (202). Any vapor that reaches this exit (202) will be condensed by the coils and the resulting liquid returned, via a return channel (210), to the rinse sump to be revaporized. A lip (203) surrounding the exit (202) and under the condensing coils catches the falling water on all sides of the exit (202) and channels it to the return channel (210).

Various vent lines are contained in the apparatus illustrated in FIG. 2 to assure that, during start up or operation of the process, all non-condensable gases such as air, nitrogen, or carbon dioxide are eliminated from the exit section. The primary liquid zone may contain a water return line to the rinsing liquid zone to return any condensed steam in the wash liquid zone to the rinsing zone.

In operation of the second embodiment, the assembly to be cleaned enters the first sump of the apparatus and is lowered by a conveyor (220) into the terpene or alternative solvent (221) to be cleaned. Terpenes represent a broad family of unsaturated, isoprene-type hydrocarbons and alcohols that exist naturally in most essential oils and oleoresins of plants. For example, one simple terpene, limonene ($C_{10}H_{16}$), is a major component of a cleaning solvent mixture marketed by Petroferm under the trade name "BIOACT EC-7". This solvent possesses the following significant properties:

Boiling point at atmospheric pressure $-170°$ C.;
Flash point at atmospheric pressure $-$C.O.C. $71°$ C. and T.C.C. $47°$ C.; and
Vapor pressure $-1.6$ mm Hg at $20°$ C.

The assembly passes under the first separator (222) and exits the terpene (221) into the internal vapor space (224) of the apparatus, the vapor being steam formed by the boiling water and totally or partially saturated with terpene vapor. In this internal vapor space (224) the assembly can be sprayed with terpene liquid for further washing action. One advantage of the current invention is that terpene, which is flammable in air at room temperature when atomized by spraying, will not be flammable when sprayed in pure steam.

There may be several water wash sumps prior to the final boiling water sump. The water in these sumps is cascaded in a direction counter to the flow of the assembly. Water from each of the additional water sumps is sprayed at the assembly as it passes over each of these sumps.

After passing over any of the optional water spray sumps, the assembly is lowered by the conveyor (220) into the boiling water sump (225) and under the second separator (223). Since the boiling point of pure water is 100° C., the assembly is heated to at least this temperature, rinsing off the terpene. The assembly is raised into the exit vapor space (226) containing steam. During continuous operation, the vapor zone (226) will contain some terpene vapor and hence be operable at a somewhat lower temperature, in the range of 97° C. to 99° C. The assembly can then be sprayed with clean distilled water that is obtained as the condensate at the exit condensing coils. The assembly is then reheated by the condensing of the steam onto the assembly's surface. Preferably, the steam is superheated by an auxiliary heater (230) to insure that the assembly will leave the apparatus at a temperature in excess of 100° C. When the assembly exits the apparatus into the dry ambient air, any remaining moisture will evaporate quickly or flash into the ambient air.

One advantage of using water-steam in the present invention is the drying process. One problem with using aqueous cleaning or rinsing is that it is difficult to dry water from the surface of the product. For example, if one immerses an assembly in liquid water at 50° C. and then attempts to dry the assembly using air knives, the evaporation process will rapidly reduce the temperature of the assembly making further evaporation increasingly difficult. With the proposed process, the assembly can be heated to the vapor temperature either by immersion in the boiling fluid or by condensation heat transfer from the vapor. The assembly can even be heated to a temperature in excess of the boiling temperature by super-heating the vapor with an auxiliary heater. When the assembly, which is at a temperature equal to or greater than 100° C. (for water vapor), is removed into the ambient air the moisture can more rapidly evaporate or "flash" to the unsaturated ambient atmosphere.

Alternate versions of the second embodiment of the present invention may use other fluids in the first sump as a solvent. Examples of additional solvents include: aliphatic hydrocarbons with surfactants such as a mixture marketed by E.I. DuPont DeNemours under the trade name Axarel, and oxygenated solvents such as marketed by Exxon under the tradenames ACTREL and EXXATE.

Figure 3:
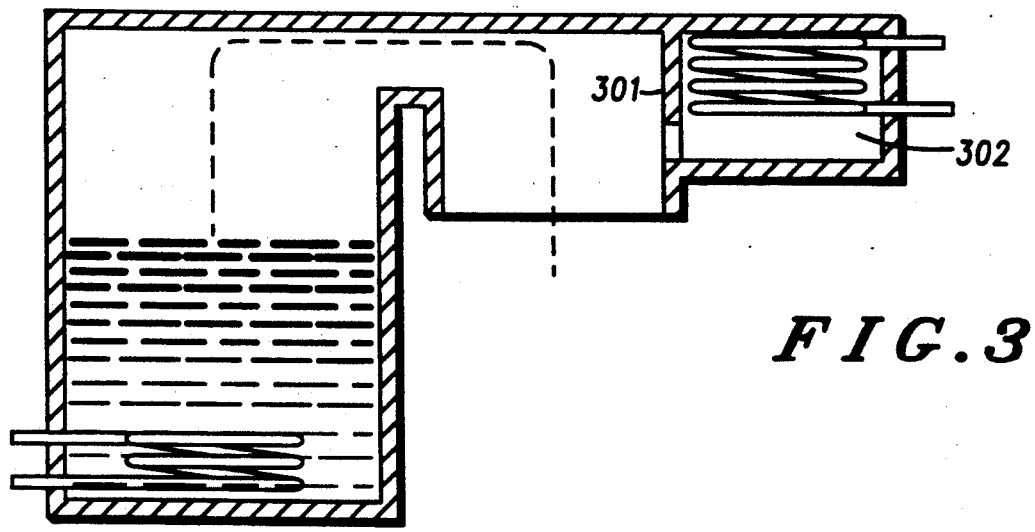
FIG. 3 shows an alternate embodiment of the present invention using an inverted weir.

FIG. 3 illustrates yet another embodiment of the present invention. This embodiment uses an inverted weir (301) that functions to maintain a horizontally-stratified interface, wherein the water vapor passes into a separate chamber (302) to be condensed. The pure water condensate is collected within this separate chamber and returned to the boiling water or aqueous detergent sump, or used for spraying the assembly after immersion in the boiling water or aqueous detergent sump. The length of the inverted weir (301) can be tailored to provide a stable steam-air interface at particular position within the machine. The wier (301) eliminates the need for condensing coils at the entrance/exit of the appartus.

In each of the above embodiments, the apparatus is insultated. This maintains the internal temperature at the desired level and keeps the outside of the apparatus at a safe temperature.

We claim:

1. An apparatus for containing vapor of a condensable liquid having a vapor density less than that of the ambient atmosphere, the apparatus having at least one downward facing opening, the apparatus comprising:
    means for containing the condensable liquid;
    means for heating the liquid to form the vapor;
    means for condensing the vapor substantially near the at least one opening;
    a subdivided vapor containment means communicating with the liquid containing means and the ambient atmosphere, said vapor containment means including a stable, stratified vapor-atmosphere interface in the at least one opening;
    a sump positioned below the at least one opening; and
    means for channeling the condensed vapor to the sump.

2. The apparatus of claim 1 and further including:
    means for channeling the condensed vapor; and
    means for spraying the condensed vapor, coupled to the means for channeling.

3. An apparatus for containing vapor of a condensable liquid having a vapor density less than that of the ambient atmosphere, the apparatus comprising:
    a vapor generation chamber for containing the condensable liquid;
    means for heating the liquid to form the vapor;
    a condensing chamber communicating with the vapor generation chamber, the condensing chamber having a horizontal bottom surface and an opening in the bottom surface communicating with the ambient atmosphere; and
    a condenser immediately above the opening, wherein the condenser maintains a stratified vapor-atomsphere interface in which the vapor, having a density less than that of the ambient atmosphere, overlies the ambient atmosphere.

* * * * *